United States Patent
Zapp Glauser

(10) Patent No.: US 8,815,319 B2
(45) Date of Patent: Aug. 26, 2014

(54) LOW GLYCEMIC IMPACT BREADS FOR THE NUTRITION OF DIABETICS, OBESE AND METABOLIC SYNDROME DIETS

(71) Applicant: Jorge Luis Zapp Glauser, Bogota (CO)

(72) Inventor: Jorge Luis Zapp Glauser, Bogota (CO)

( * ) Notice: Subject to any disclaimer, the term of this patent is extended or adjusted under 35 U.S.C. 154(b) by 0 days.

(21) Appl. No.: 13/669,798

(22) Filed: Nov. 6, 2012

(65) Prior Publication Data

US 2013/0064926 A1 Mar. 14, 2013

Related U.S. Application Data

(63) Continuation-in-part of application No. 12/661,160, filed on Mar. 11, 2010, now abandoned.

(30) Foreign Application Priority Data

Mar. 16, 2009 (CO) .................................. 09-027012

(51) Int. Cl.
 *A21D 2/26* (2006.01)

(52) U.S. Cl.
 USPC ........... 426/243; 426/302; 426/496; 426/518; 426/519; 426/523; 426/524; 241/6

(58) Field of Classification Search
 CPC ...... A21C 1/12; A23L 1/0029; A23L 1/0128; A23L 1/0135; A23L 1/0255; A23L 1/1041; A23L 1/16; A23L 1/30; A23L 1/305; A23L 3/36; B02C 7/00; B02C 7/17; B02C 7/18–7/188; B02C 9/00–9/04
 USPC ............ 426/94, 96, 302, 307, 496–498, 518, 426/523–524, 243; 241/6, 8
 See application file for complete search history.

(56) References Cited

U.S. PATENT DOCUMENTS

| | | | | |
|---|---|---|---|---|
| 3,952,958 A * | 4/1976 | Rich | ............................. | 241/162 |
| 4,419,374 A * | 12/1983 | Pei | ................. | 426/243 |
| 5,281,433 A * | 1/1994 | Gantwerker et al. | ......... | 426/549 |
| 5,875,978 A * | 3/1999 | Wingler et al. | ................. | 241/55 |
| 6,706,305 B2 * | 3/2004 | Wolt et al. | ....................... | 426/549 |
| 2005/0118326 A1 * | 6/2005 | Anfinsen et al. | .............. | 426/658 |
| 2006/0138256 A1 * | 6/2006 | Horigane et al. | ............... | 241/23 |
| 2007/0098866 A1 * | 5/2007 | Waller et al. | ................... | 426/549 |
| 2007/0104855 A1 * | 5/2007 | Arndt et al. | .................... | 426/622 |
| 2007/0172575 A1 * | 7/2007 | Gune | ............................. | 426/641 |
| 2007/0275121 A1 * | 11/2007 | Malby | ............................. | 426/19 |

* cited by examiner

*Primary Examiner* — Drew Becker
(74) *Attorney, Agent, or Firm* — Richards Patent Law P.C.

(57) ABSTRACT

A method for producing low Glycemic Index bread and baked products for diabetic dieting and Metabolic Syndrome patients using a selection of ancient cereals, pseudo cereals and grain varieties with high content of complex carbohydrate molecules, low speed and low adiabatic temperature milling, encapsulation of carbon dioxide bubbles created during leavening of dough in a slowly digested denaturalized protein matrix, inclusion of partially milled chunks of cereal and grain into the dough, baking at low temperatures and short time periods, rapid chilling of the bread and freezing for storage.

18 Claims, No Drawings

US 8,815,319 B2

LOW GLYCEMIC IMPACT BREADS FOR THE NUTRITION OF DIABETICS, OBESE AND METABOLIC SYNDROME DIETS

This application is a continuation-in-part of U.S. application Ser. No. 12/661,160 ("the '160 application") filed Mar. 11, 2010. The '160 application is incorporated herein by reference.

SUMMARY

In order to reduce the glycemic load in the daily nutrition of diabetics, obese and for Metabolic Syndrome diets, this invention claims successive and interdependent: grain selection, milling, kneading, leavening, baking and storing processes and procedures for producing and preserving raw complex Carbohydrates in low glycemic impact bread and other baked products, hereinafter referred to interchangeably as the logicarb process or logicarb breads or logicarb. As used herein, the term bread shall mean bread, waffles, crackers, cakes and any baked products. None of the claimed processes alone is able to insure a high complex carbohydrate product; at least half of said processes all have to be interlinked in a continuous sequence. By several innovative processes, the structure of the original complex Carbohydrates (amylose, amylopectin, oligosaccharides, etc.) found in raw cereals and especially in ancestral cereals is partially or totally preserved. An unprecedented high complex carbohydrate content in bread (and equivalents) is produced by those subsequent processes, allowing the ingestion of less restricted servings of bread-like products, very similar to the conventional ones; while due to their prolonged digestion, it naturally limits the immediate release of blood-glucose spikes and unnecessary release or demand of insulin, thus inducing appetite satisfaction, reduced food anxiety and allowing diabetics and those suffering the expressions of Metabolic Syndrome, to return to a non inflammatory and normal 'three meals a day' nutrition.

Technical Field

Diabetes: up to now, constitutes a chronic and incurable disease, characterized by lack of control in the concentration of blood-glucose. The presence of this glucose (glycemia), over the normal values (fasting—75 mg/100 cc to 99 mg/100 cc) generates a growing risk of damage in most of the proteins of the body exposed to blood with exaggerated contents of glucose, which is 'corrosive' to the organism's proteins. As a function of its disproportionate concentration and the elapsed time, it ends up destroying, lower limbs capillaries (amputation), while in its culmination, its permanent damage deploys from the degradation of the kidney structure (kidney failure or dialysis) to damages in the ocular retina (retinopathy, blindness). On the other hand, it generates high risk conditions for the cardiovascular system; most diabetes patients (treated and untreated) come to die due to complications (renal & cardiovascular) directly associated with its disease. The best estimate for the US, show that 25.8 million Americans have diabetes—8.3 percent of the U.S. population; of these, 7 million do not know they have the disease, some 79 million adults aged 20 and older have pre-diabetes, and every year, about 2 million join the diabetics group. 95% of all diabetics correspond to "Diabetes Type 2 (t2)" previously known as 'non-insulin-dependent' or 'adult-age diabetes', while the other 5% or less, suffer from Diabetes Type 1 (t1), previously called 'insulin-dependent' or 'child diabetes'. These definitions have changed in the recent years.

Diabetes Type 1 (t1): the body normally controls the quantity and destination of blood glucose by the production of the hormone 'insulin'. When the pancreas (insulin generator) fails; lack of production (or an important limitation) of insulin generates the so called diabetes Type 1, resulting in a failure in the appropriate use of glucose which provides the only source of cell energy. Diabetes t1 must necessarily be treated with external application of such hormone, replacing the function of the organ.

In diabetes t1 patients, the supply and control of insulin goes on first place of importance, while diet and exercise go in the second place. Regularity in the ingestion of carbohydrates, obesity and cholesterol control as well as slow-digestion food at night to avoid morning hypoglycemia, are the main aims of diet in the case of diabetes t1 patients. The logicarb process can be useful to reduce glycemic peaks (both positive and negative) thus facilitating the control of the disease as well as obesity. Logicarbs as used on these patients are useful and complementary to exercise, but it is not the main tool for their treatment.

Diabetes Type 2: In Diabetes Type 2 (t2) patients, their pancreas usually keeps on producing variable quantities of insulin for a certain time, though because of genetic or nutritional causes, insulin lacks destination capacity to take glucose into the cells (insulin resistance) where it must be vitally consumed or stored. Their body resists the normal and healthy action of insulin. With this lack of control, glucose increases its concentration (glycemia raises) in blood, damaging (glycating) those body proteins exposed to a 'corrosive blood'. Their liver, when receiving the vehement call of need (Glucagon) induced by the body cells (through the pancreas), deprived from food, generates even higher quantities of new glucose from its glycogen reserves, which worsens glucose concentration in blood. The drugs universally used in Diabetes t2 are of the type of 'Metformin', which minimizes the production of undesired excess of glucose by the liver and exerts some action on insulin resistance.

The most common treatment of Diabetes T2 is therefore, a diet where the controlled ingestion of carbohydrates transformable into glucose is reduced to an acceptable minimum, while the consumption of complex Carbohydrates (with a longer digestion) and proteins (that do not directly convert into glucose) is usually recommended. Important complex Carbohydrates sources are very limited in the Western world food supply. Fats, which would seem to be an attractive source of calories, are not a practical option, because of their ill effect on the cardiovascular system, weakened by the disease.

The other element of control of this type of diabetes is exercise, which directly consumes the excess of glucose or glycogen, while improving the cardiovascular and cell absorption systems. Diabetes t2 patients wanting to keep a normal level of average glycemia, have to undergo a hunger diet, ranging from 1500 to 1800 daily kilocalories (Calories), or to eat slightly more, five and up to six times a day in small portions which induces harmful digestive inflammation. For them, the traditional amounts of rice, potato, pasta or bread are strongly reduced, in the recommended diets, to levels similar to "a third of a cup" while they are replaced with big volumes of legumes and specially vegetables with a low carbohydrate contents. As this regime is almost impossible to follow, especially if a lot of exercise is done as recommended, patients just eat more freely (cheat their diets), disobeying the indications of the treating physician, (or being unaware of their disease). In the USA, the percentage of blood-hemoglobin damaged by the excess of glucose [(HbAlc) or glycated]: an indicator that renews every three months showing glucose induced damage to the rest of the body) in US diabetics (aware and unaware), shows an average of 9.4%, (equivalent to a dangerous average glycemia of 220 mg/dl), where values over 7% are worrying with respect to the normal standards of healthy people (between 5% and 5.9%). These morbid values are mostly the effect of a 'perverted licentiousness' in diet, generated by the fact that even very high levels of glycemia do not commonly produce immediate symptoms in most cases and patients usually do not care for their long term effects. With those uncontrolled levels of glucose in blood, a high risk of permanent damage to the different organs of the body is guaranteed in the medium and long term. Statistically, 80% of diabetic patients die prematurely due to those complications induced by their chronic disease. An acceptable diet in social and personal terms, such as the one based on 'logicarbs' bread and equivalents, claimed by this invention, improves life quality and prospects for this 95% of diabetes patients: especially those with Type 2 or other Metabolic Syndrome expressions.

Obesity and Metabolic Syndrome: constitutes a chronic interrelated and progressive disease in the world, which grows as societies acquire a likeness (even with frenzy) for predigested food (there is almost no obesity within really primitive peoples, Price). Diabetes patients, as well as healthy people who consume short or refined carbohydrates in excess, experience a process of automatic absorption of the directly consumed glucose (e.g. candies, pop-drinks or snacks) as well as the one generated by the quick digestion of most conventional refined carbohydrates (bread, cakes, rice, potato, pasta, etc.). Once the new glucose comes into the blood, it can only go three ways: a) it is profitably spent for a short time, thanks to the insulin, in providing energy to the different activities of the body (brain, muscles, exercise, body heat, functioning, etc.), normally when the consumer is not a diabetic and rather delayed on diabetics due to insulin resistance b) it is stored, in the form of a small quantity of 'glycogen' (a complex human carbohydrate) in the liver and muscles for emergency expenditure, or c) in an unlimited manner, the end balance of blood-glucose is transformed by the liver into blood-fat (triglycerides), for an even slower storage as obesity, and even worse, inducing lipid cardiovascular disease. In its morbid stage, the excess of fat is increasingly stored as deforming adiposities in all the body which further distort metabolism that worsen the obese life quality, all of them, inducing Metabolic Syndrome. In a perverted way, the continuous ingestion of excessive and regular doses of those short refined carbohydrates (less than 12 glycosides), typical of the American nutrition style, are almost immediately transformed into glucose; initially, demanding large amounts of natural insulin which induces hunger and later gradually atrophying the capacity to burn fat (to re-transform it into glucose for energetic expenditure) making the obese person to feel a 'continuous hunger'. The result is the gradual increase in weight; the difficulty to reduce it, the deformation of the body, and the increase of multiple diseases associated to obesity (Metabolic Syndrome), as diabetes t2 itself and the cardiovascular ones, inducing an important reduction in life expectancy and quality. Mortality of diabetics almost doubles the one of non-diabetics after the age of 20.

Known State of the Technique

Limitations of the conventional diet for diabetes patients t2: as it was said above, "Diabetes t2 patients wanting to have a normal level (of average) glycemia, have to undergo a hunger diet from 1500 to 1800 daily kilocalories, or eat slightly more, five or even six times a day in small portions".

The drug most commonly used in this type of diabetes is 'Metformin', which just minimizes the production undesired glucose excess by the liver. This limitation, summed to the 'metabolic hunger' of body and especially brain cells hunger, induce a real and difficult to control urge for sweets and refined short carbohydrates (bread, rice, pop dirks, candy etc.) which constitutes the principal psychological enemy of diabetic diets. Diabetes is a non-human disease with a morbid positive feedback our body is not able to fight.

In our modern world where almost all energy food has been genetically transformed to increase its short term availability of glucose, summed to the fact that many industrially processed foodstuffs are also transformed in the same direction, and finally, with the social development of conventional cooking styles, all of them induced by our primate ancestral urge for sweet (instant blood glucose) has been interpreted by the world's food-business as a market opportunity, a deadly one, which has transformed into the main cause of death in our modern world. Humanity is confronted with two unbearable problems. On one side, this type of food is affecting global health (Metabolic Syndrome) in a way that only primitive peoples (maybe including Mediterranean cuisine in that group) prove to be refractory to the ill effects of modern food, and on the other side, those already suffering those ill effects have very few options to structure a diet capable of treating or reversing their generalized disease. Only pulses, barley, flax seed and nuts, summed to vegetables, rich in fibers, minerals and vitamins but poor in carbs and protein, represent a limited option to this diet, far from the social tendencies and from the commercial supply. This is the dramatic situation addressed by the invention of the logicarb process as presented in this document.

(references) The most common treatment for Diabetes T2 is, therefore, a diet that reduces to a semi-acceptable minimum the ingestion of conventional-commercial carbohydrates, directly transformable into glucose, or increasing the consumption of complex Carbohydrates (with a longer digestion such as chickpeas) and proteins (that are not transformed directly into glucose). In careful searches it was impossible to find, patents systematically claiming decreases in the glycemic impact of food through culinary or industrial food-procedures for socially or traditionally eatable food, with the exception of a known recommendation to prefer pasta 'al dente' over well cooked pasta (Whitaker or Brand-Miller et al.). Only one reference (M. Champ, et al. 1999) in the whole specialized literature, dealing with the possibility of digesting highly complex starches (the empirical base of 'logicarbs') reads as: "Main methods which are validated with digestibility values (of resistant starch) obtained from human volunteers, provided acceptable values but never exempt of criticism". ("complex Carbohydrates in Foods" edited by Susan Sungsoo, et al., Marcel Deker press, 100 specialized authors, 1999, a forced reference on the subject).

(other breads) T2 diabetics, that constitute 95% of all diabetic patients must necessarily to drastically restrict or control the ingestion of conventional carbohydrates, especially those that are easily transformed into glucose by the immediate action of the enzyme 'amylase' in saliva and other gastric juices, in order to reduce or eliminate the damage to their bodies. For example, conventional 'white rice' or "French baguette", are almost fully transformed, easily and quickly into glucose that passes directly to our blood stream in less than an hour. There is almost no difference, between the increase in glycemia produced per 50 gr. of 'baguettes' (on a dry base) or by 50 gr. of chemically pure glucose, both increase blood-sugar to a morbid level. Furthermore, dietary recommendations such as the consumption of 'whole meal bread' and even 'whole-grain bread', for example, are very limited in their modern impact for the following reasons: a) a 'dark whole-meal wheat bun' is typically based on a 'highly processed flour' to which 5% to 15% bran (wheat husks or bran) has been added to make it look like "whole wheat." In other cases, mixtures of highly processed flour and whole grain flour are also used for these products. In practice, all those dark, whole-meal or 'whole wheat' breads are almost equivalent to 'white bread' used as the prototype of the most undesirable food (base 80 to 95 of several rating systems of 'Glycemic Index' classification) in other cases highly invisible fructose products as raisins are also added. In practice, the dark colored bun typically presents a perverse Glycemic Index of 85 to 90. b) 'whole-grain bread' (wheat or rye) represents the best widely available commercial alternative to eat at least, some complex carbs, though it is also largely absorbed as blood glucose in a proportion of 60% to 70% of its available carbs (IG=60 to 70); because of the fine milling and long baking required to guarantee its lightness (conventional $CO_2$ bubbles) as well as its conventional baking and cooling. For example, a typical whole grain bread serving, with 50 gr. of available carbs, eaten as an only breakfast (no milk, fruit, butter or marmalade) raises a diabetic blood sugar of a full diabetic Type2, (starting at 100 mg/100 cc in fasting) to some 200 mgr/100 cc to 240 mgr/100 cc, a high glycemic spike (measured one hour after eating), when well chewed with saliva, as recommended in all diets. One could imagine the complete result on the patient's blood glucose after breakfast, if those bread slices are added with 10 gr. lactose from milk (in coffee), another 10 gr. of (invisible) fructose in a 'no sugar' marmalade and up to 25 gr. of sugar (quite invisible to the meter because of fructose) of an orange juice. The deceptive result: no bread, maybe with the exception of sprouted wheat bread (i.e. Ezequiel) in which the conventional (destructive) milling is spared, with a Low GI but above 'logicarbs' breads is a usable alternative. Logicarb breads, on the other hand, with much less of that amount, represent a very valuable alternative.

(fructose) By a perverse misfortune, fruit fructose directly enters into the bloodstream of primates in a free fowl. It also contributes as the excess of blood sugar to body protein damage. According to recent studies: to an even greater damage on body-proteins, with its chemical action (not only in its C-1 carbon but also with its C-2 carbon atom) causing far greater damage on proteins in the body that the same amount of glucose. Perversely, fructose is not measured by the glucometer and is not reported in the Glycemic Index references, and even worse, it stays hidden in the blood for hours while the liver processes glucose causing 10 to 14 times more harm. Many European diabetic books still recommend damaging fructose just because of its perverse invisibility.

(Our pre-digested food): it is commonly known that primitive peoples in the Americas, Oceania and Africa, suffer virtually no diabetes (Weston Price); these peoples, when they migrate to effluent civilizations like America, tend to be affected in a few years with T2 diabetes with double or triple intensity. The reason is relatively simple, with a weaker genetic background, they move from very similar and naturally far better nourishment, to one in which only 'pre-digested' Western supply of energy-food is available. Their new and most desired food supply is literally processed with saliva as a deadly blood-sugar tsunami on every meal.

(a nutritional Western-culture picture) The 8 or more meters of intestine (25' to 30'), which took more than five million years to develop, from a diet of fruits, buds, flowers and insects, to an open savannah diet based on seeds (pre-cereals), root vegetables, sprouts, flowers, berries (and meat in the last million and a half years), ceased to be necessary for the digestion of most food, especially during the last 150 years. We have reached the limit of consuming pure glucose in sweets, jams, refined fruit-juices, and some sodas. If a conventional t2 diabetic had always fed himself with the nutrition food scheme of an Australian aborigine or an African Bushman, it would be almost impossible to know that he is diabetic, unless he would be forced to eat those 75 gr. of glucose of a standard postprandial glycemia test (if he ever would have developed diabetes).

In other words, t2 diabetes may be visualized (with a lot of medical freedom, however) as a lifestyle and probably hereditary disease that manifests itself in the presence of food "careful and perversely predigested' to be mostly transformed into blood-sugar, such as table sugar, bread, cookies, cakes, pasta, rice, potatoes, pizza, soft drinks . . . . Anyway, it is just the description of any table in a developed Western country, with only local variations in style. Moreover, for non-diabetics, the well directed insulin function, beyond bringing the energy (glucose) to all cells of the body to supply their demands, it also directs all their 'modern surplus of glucose' to the liver to be transformed into a limited amount of Glycogen (a complex carb) for emergency use and into triglycerides feeding unlimited reserves of fat (obesity) and inducing cardiovascular disease. When the body gets used to operate by subsequent overdoses of glucose (or modern food that readily transforms into glucose in minutes) the further decline in blood glucose every two hours (because of a typical pancreatic reaction to a glucose 'tsunami'), will reflect the anxiety for its immediate resupply, or in the pathological case: hypoglycemia or even hyperinsulinemia. Not surprisingly, obesity with such a perverse diet has become a widespread and irreversible epidemic. A recent Harvard study on fiber, demonstrates, that obesity, associated with diabetes t2 and Metabolic Syndrome, can be handled or prevented with high fiber nutrition (it does not say why, apparently nobody precisely knows why). Metabolic Syndrome is apparently the result of the same cause: a Western diet, that especially in the last 150 years, (for dubious 'technological advances', literally just follows the natural commercial greed of the market'). 'Normal' food predigested genetically, industrially and in the pot or oven, just to make it instantly assimilable as glucose: a perverse "Predigested Diet" is now universal in the developed and 'civilized' world, and as all the population including the medical profession are fully submerged in such a strange environment; it has become invisible, but capable of heavily affecting the health condition of about one half of the middle age population and now, affecting even children.

DESCRIPTION

Brief description of the invention: Carbohydrates are the main source of body energy; Glucose is the only form in which carbohydrates can feed living cells. Glucose and other mono-saccharides are its simplest single molecule forms and can enter directly into our bloodstream. Monosaccharides associate as weak polymers on chains or fractals of different length and size (all other carbohydrates). Those short ones (2 to 12 saccharides) are made readily available in just one hour to our body, via their transformation into monosaccharides by the action of the enzyme 'amylase' present in our saliva and the pancreatic juices. Longer ones (12 to 50,000 saccharides known as amylose, amylopectin, oligosaccharides and fixed starches) are considered: complex Carbohydrates, soluble fiber and fixed starches which conventionally are only partially digested or simply considered as non-digestible.

In order to reduce the glycemic load in the daily nutrition of diabetics, obese, weight-reducing diets and in general on Metabolic Syndrome expressions, for the production of bread, this invention claims the selection of ancient cereal varieties and species including but not limited to durum wheat, einkorn, Kamut or barley referred to as "ancient" cereals with raw Glycemic Index under 40, seeds have suffered the least genetic transformation (intuitive or scientific), allowing those cereals to contain the largest proportion of complex Carbohydrates. With the same purpose, the development of processes and procedures for the immediate baking of bread, waffles, crackers and cakes, rich in complex Carbohydrates, in which, the structure of the original complex Carbohydrates (amylase, amylopectin, etc.) naturally found in the raw cereal (and specially in ancestral cereals) are preserved to a feasible maximum; well protected from the fracturing of their complex Carbohydrate molecules by effect of the adiabatic heating during the milling process, or by prolonged high temperatures during conventional baking and cooling processes. In this logicarb invention, those ill effects on the molecular structure are purposely minimized to preserve said complex carbohydrate's original molecular structure found in their raw seeds. Food digestion with the above mentioned characteristics, low Glycemic Index carbs or simply logical carbs.

These processes and procedures allow eating less restricted bread, cake, crackers or waffle servings very similar to the conventional ones. On logicarb bread products, only a small proportion of short carbohydrates (1 to 12 glycosides) are readily transformed into blood glucose, increasing glycemia only by a fraction (usually to less than 140 mg/dl in its one hour spike), while the main load of complex carbohydrates are very slowly (24 hours) digested. This condition generates an environment for an appetite satisfaction which reduces hunger and food craving between meals.

Even though many of the processes to be claimed in the inventive method have been used in history for different purposes, in this case are specifically claimed as a way to preserve the molecular structure of complex carbohydrates. The main steps of this inventive low-glycemic bread production process include: a) preferring ancestral cereal varieties over the high production ones; b) milling grain for bread, using several stages in unusually slow speed milling stones (or equivalent) to prevent the adiabatic degradation of complex Carbohydrates; c) given that a complex carbohydrate dough is no consistent to stabilize $CO_2$ bubbles because of the size of their macromolecules, the encapsulation of carbon dioxide in leavening bubbles enhanced by animal or vegetable protein (albumin or gluten and even dextrine); d) fast baking followed by fast cold quenching of the bread loafs to preserve and even to rebuild the structure of their complex Carbohydrates; e) preserving "logicarb' bread frozen to prevent its enzymatic or bacterial or fungal degradation'.

Detailed description of the invention: ""logicarb"', is deployed as an alternative nourishment, digestion and nutrition intended to minimize the perverse effects (leading in many cases to Metabolic Syndrome) of the "Pre-Digested 'Modern' Diet", based on short carbohydrates conventionally nourishing most of the developed modern world. This invention claims the selection of ancient cereal varieties and species, like durum wheat, einkorn, Kamut or barley and pseudo cereals like quinoa, for the production of bread; cereals which have suffered the least genetic transformation (intuitive or scientific), thus leading to increase their beneficial complex Carbohydrates contents; it also claims a series of processes and procedures to manufacture and bake bread (and equivalents) rich in complex Carbohydrates for a slower and more complex digestion.

With the advent of agriculture and with intuitive genetics (similar to the one that allowed transforming wolves into dogs), we humans were able to increase to 50% the amount of readily transformable short carbs in our most common cereals and starchy roots converting them into 'virtual fruits'. This genetic process, summed to the harm caused to complex Carbohydrates by conventional cooking or baking plus industrial refining processes, are responsible for our modern Western diet, which readily transforms short carbs into a massive 'intravenous injection' of glucose, capable of inducing obesity, diabetes, arteriosclerosis, heart disease and in general Metabolic Syndrome.

The main steps of this low-glycemic bread production inventive method comprise: a) preferring ancestral "ancient" cereal varieties over the high production ones; b) milling grain for bread, using several stages in unusually slow speed milling stones (or equivalent) to prevent the adiabatic degradation of complex Carbohydrates; c) given that a complex carbohydrate dough is no consistent to stabilize $CO_2$ bubbles because of the size of their macromolecules and particles, the encapsulation of carbon dioxide in leavening bubbles enhanced by animal or vegetable protein (albumin or gluten and even dextrin paste); d) fast baking followed by fast cold quenching of the bread loafs to preserve and even to rebuild the structure of their complex Carbohydrates; e) freezing "logicarb' bread to preserve and prevent its bio-degradation; f) including in bread and other bread like products and even as an additive to complex Carb meals, small grain chunks, 0.2 to 2 mm in size, which are also slowly digested. None of these steps alone is able to produce a high in complex Carbohydrates low glycemic bread, at least half of the claimed steps have to be carefully combined in sequence to attain that goal. 'Logicarbs' Breads (apparently conventional in its appearance, taste and texture), has a glycemic load of less than one half (or even less), when compared with most of their commercial conventional healthy-bread equivalents in our fully accepted modern 'civilized' nutrition. Bread, waffles and cakes produced under the same principles and procedures claimed in this invention help to better regulate carbohydrate impact, while the quantities consumed are closer, (maybe smaller because of the high efficiency of this direct nutrition), to those servings accustomed before the illness. On the other hand, when a gradual production of glucose stabilizes over time, it creates a feeling of hunger-satisfaction, thus avoiding eating between meals, time which can be profitably used, for example to eat and digest full fruits with a different, short term digestive process, not interfering with complex carbohydrate digestion. The need for five to six meals a day is easily replaced by the conventional three, thus reducing digestive inflammation.

In cases of other digestive diseases such as diverticulitis, for example, "logicarb' should be totally discouraged, it is therefore highly recommended to consult its convenience of a high complex Carbohydrates diet with the treating physician.

The objects of this invention are as follows:

object 1 (sources): supplying our digestion and most of our energy needs with long complex Carbohydrates capable to develop a regulated slow digestion.

In our modern 'civilized' world our energy-supply of carbohydrates is dominated by short carbohydrate chains of 1 to 12 saccharides which are normally digested in our mouth, stomach and duodenum by a special enzyme called amylase.

Long and complex carb chains and fractals (amylopectin, oligosaccharides, etc.) are very slightly modified by the amylase enzyme during the first hour of conventional modern digestion. Old varieties of wheat like 'durum wheat', einkorn or Kamut, barley, quinoa or flax-seed with raw Glycemic Index under 40 and other similar cereals or pseudo-cereals, have proved to be ideal for this specific therapeutic purpose and have been less genetically modified in the wrong unhealthy direction. Some special cereal-genii proteins and enzymes are also preserved by the special processes presented in the following objectives.

Only one reference (M. Champ, et al. 1999) in the whole specialized literature reads as: "Main methods which are validated with digestibility values (of resistant starch) obtained from human volunteers, provided acceptable values but never exempt of criticism".

The research which developed the concept of "logicarb' has proved that slow absorption of energy from long carbs.

Complex carbohydrates was precisely, the molecular structure sought by nature to prevent valuable seeds to easily serve as animal food. Ancient stone grinding in the primitive "Metate" (two roughly carved stones) or the prehistoric fracturing of those grains with our teeth expose their interior to gastric juices but particularly to specialized intestinal bacteria, which slowly developed during our evolution to digest those complex Carbohydrates in a process that typically lasts 24 hours.

Modern industrial mills, on the contrary, raise the temperature of the interior of the grain by the impact of the hammer or fast rolling, through an instantaneous deformation with no heat exchange (adiabatic) necessary for the ultrafine grinding and processing demanded by our modern refined food products (breads, Béchamel S., pizza, soups, cakes, etc) forcing the fracturing those original raw polymers (complex Carbohydrates of the type of amylose, amylopectin, oligosaccharides, etc.) into readily transformable short carbs. Under conventional mechanical processing, refining, baking, cooling and storage, raw complex Garbs fracture significantly into monosaccharides or short polysaccharides (one to twelve single sugar molecules (saccharides) associated into a readily digestible starch like a French baguette, the prototype of 'civilized' food.

In our traditional Western diet, those small processed molecules including sugar are easily transformed into highly assimilable forms of monosaccharides like glucose, fructose and galactose in less than an hour, by the action of the enzyme amylase in our saliva and other gastric juices.

Food from grains, to be healthy in the concept of 'logicarbs' therefore, should be ground (and baked) with very definite and careful processes, to specifically and modernly reproduce, the way in which we processed and consumed grains over millions of years.

Carefully controlled baking methods by microwaving, low controlled temperatures and/or high pressure, as well as sudden chilling, not only preserve the structure of most of these large polymerized starch forms which remain intact (or complex), but also tending to reconstitute complex carbohydrates by retrograding polymerization, prolonging its digestion along the different stages of the gut, without changing the shape, texture and taste of otherwise traditional food. The most important steps for producing "logicarb' bread are all closely interlinked. None of these processes alone is able to produce a high in complex Carbohydrates bread; i.e. short baking, does not add significant properties to the product unless it is applied to slow, multistage milled flour of the cereal. Or, naturally high complex carbohydrate flour, loses almost all its healthy properties after a long conventional baking, cooling and storage periods of any commercial bakery. The process sequence claimed conforms therefore, a production unity capable of presenting in a modern form a prehistoric food.

object 2 (mechanical): when cereals rich in complex Carbohydrates are milled without introducing instant heavy stresses capable of generating high grain internal temperatures (adiabatic compression or shearing heat) their complex Carbohydrates are almost totally protected at that stage. In practical terms, this principle means that milling has to be performed in several subsequent stages at very low shearing speed. These processes protect the desired contents of complex carbohydrates. Because of carbohydrate degradation time and oxidation, specialized milling and baking have to be almost immediately performed to reach the necessary results. This invention biochemically identified a milling process, different from the conventional and modernly accepted industrial one (hammer or high-speed rollers), demanded by bakers, characterized as in the Middle Ages, by grinding stones or other grooved materials that act on the grain at an extreme slow speed and in slow several multi-stages, in which, the temperature does not rise to damaging levels inside the grains or their fractions. This is not a romantic return to ancient technologies, but the very specific goal of not reaching those temperatures that adiabatically break down an important part of their natural carbohydrate polymeric structure. Selecting multiple stages and shearing speeds of less than 0.9 m/s leading to low micro-internal grain temperatures (during the milling operating) approximately under 45° C. are essential. The shear speeds between those milling stones or grinding wheels (flat, conical or cylindrical) should be equal or less 0.9 meters per second (preferably 10 to 30 cm./sec.), nonexistent in the modern industrial supply as standard equipment. This special milling process has to be capable of avoiding adiabatic micro-heating of the grain above 45° C. and preferably with micro-internal grain temperatures (during the milling operation) of approximately 30° C. or less.

Although these slowly ground or crushed products, were part of ancestral food processing, both in our jaw's teeth, used as grinding stones and later on primitive two stone hand mills leading to medieval stone mills, the return to their specific use and mechanical adaptation, is the result extensive biochemical research affecting their molecular size, with the explicit aim to produce a low-impact modern flours destined to low glycemic impact products for diabetics, hypoglycemic for weight reducing diets and in general, as a nutritional treatment of the Metabolic Syndrome. Finally, starches of different kind (both short and long molecules) can perform as resistant starches (in small chunks, 0.1 mm to 2 mm in size). When they become physically inaccessible as in the case of partially milled grains incorporated in bread and seeds, or partially encapsulated particles (i.e. by denaturalized protein) to reduce its conventional digestibility while enhancing later 'logicarb' processes. These particles can be easily digested by "logicarb" digestion leaving no solid traces in stool.

object 3 (Thermal): As exposing cereals to high temperatures for a certain time degrade complex Carbohydrates (the medium life of a complex amylopectin, exposed to a 60° C. temperature is just 22 minutes), thus, the baking of bread, in order to preserve its complex Carbs has to be as short as possible and exposed to the lowest possible temperatures following the above mentioned principles. In baking, internal loaf temperatures have to be kept under 99° C., in baking periods of less than 12 minutes. The cooling times of bread loaves and even slices have to be also minimized to less than 6 minutes for the same reason, as well as to favor re-polymerization of short carbohydrate fractions into complex carbohydrates during fast cold quenching after baking. Furthermore, as "logicarb' bread loaves have a full contents of free germinating enzymes (not deactivated by prolonged baking & cooling), specially designed by nature to break down complex Carbohydrates into those short carbs demanded by germination, "logicarb' breads and equivalents, have to be frozen after baking to prevent a process of 'self-digestion' of its complex Carbohydrates; high complex carbohydrate flour also self digests its structure if this thermal principles are not applied and during process has to be also protected by freezing unless it is used in just a couple of days. Freezing also protects the "logicarb' breads from its natural germ-fats from becoming rancid (deprived from their Vitamin E Protection) and from developing molds, as no chemical additives (anti-oxidant and/or fungicides are recommended). Complex carbohydrates of 'logicarb' breads, should be thawed only a couple of days before consumption. With their fully complex carbohydrates structure protected, digestion will occur in the ileum and colon, requiring many hours (24) instead of minutes (on the stomach, duodenum and jejunum), thus delivering their nutrients gradually, "logicarbs" food, because of its prolonged digestion and production of nutrients, leaves a sense of satisfaction (not bloated) avoiding the tendency to over-eat by anxiety on: obese, diabetics and in general on patients suffering from the Metabolic Syndrome expressions. 'logicarbs' bread, when consumed as the only carb at dinner (which is strongly recommended), lowers the risk of nocturnal or morning hypoglycemia in t1 diabetic patients by its natural slow digestion. It becomes therefore, a natural nutritional treatment for hypoglycemia and even for hyperinsulinemia.

Object 4 (a real and healthier alternative to conventional 'whole grain products') Whole grain cereals and other grain's flour products are recommended in the various advanced diets (Harvard's study on fiber), because the beneficial effect of their fiber contents. In practice, this beneficial effect is rather limited as their raw complex carbs contents has been already partially reduced or fractured into monosaccharides or short polysaccharides by genetic, mechanical and thermodynamic processes during their conventional selection, milling, baking, cooling and storage, thus making them readily convertible into glucose in less than an hour by the enzyme 'amylase' of saliva and other gastric juices. In practice, 65% to 70% of 'whole grain' bread (see GI tables) is directly digested into blood sugar in one hour. It contains some insoluble fiber (cellulose and lignin –12%) that helps digestion texture and only 15% to 20% of its energy is really healthy as long complex Carbohydrates, the definition of a Glycemic Index of 65 to 70. In practice, whole grain bread long complex carbohydrate contents are only 10% to 20%, insufficient to induce "logicarb' digestive flora when accompanied with other foodstuffs. The 'logicarb' bread(s) concept is presented therefore, as a healthier alternative as it preserves a significant part of the natural polymeric structures of the starches found in raw ancient grains and cereals (amylopectin, amylose, etc.), typically a 50% contents of complex Carbohydrates especially when flour comes from ancient varieties (not usually considered useful in bakery like durum wheat (tricus durum), einkorn, Kamut or barley among others). This preservation of complex Carbohydrates carefully performs as a whole integral process in this interchanged sequence of processes, with the specific purpose of reducing their glycemic and blood-fat load impact on the expressions of the Metabolic Syndrome (overweight, ventral obesity, high blood pressure, hypertension, diabetes, arteriosclerosis and lipid heart disease). Complex carbs are only slightly or barely any digested by saliva or duodenum enzymes (amylase) and as those carb chains are not transformed directly into blood-sugar and directly absorbed in the duodenum and/or jejunum.

Object 5 (low speed flat flakes), Cereal grains, pseudo cereals and legumes are used as fillers and to provide special nutrients in 'logicarb' breads (waffles, cookies, cakes) or as a side dish, when conventionally pressed or flattened to flat flakes while preserving their complex Carbohydrates molecular structure. This process in the same way as in the milling of 'logicarb' flour is characterized by: slow crushing of the grains with rolls at very low speed (less of 0.2 m/s.) rolling banks, that avoid internal grain adiabatic heating above 45° C., preferably temperatures during the compression operation of the order of 30° C.

Object 6 (stabilizing $CO_2$ bubble membranes): Conventional whole grain flours are processed in the same way as highly processed white flour in conventional high speed mills and even in conventional high speed stone mills that destroy a large percentage of the complex Carbohydrates in the raw grain. In order to make current "dark bread", just wheat bran is added or whole grain flours are mixed in a typical ratio of 1:1 with highly processed white flour ("fortified refined flour"), to enable the structuring of dough capable to retain $CO_2$ bubbles during leavening and to allow an elastic matrix structure in bread. In bakery practice, high complex Carbohydrates flour with a coarse texture is incompatible with stable $CO_2$ bubbles. The Glycemic Index of these dark breads is typically between 78 and 90 comparable to 'white bread' or pure glucose. Whole grain breads, in order to stabilize $CO_2$ bubbles, have to be finely milled in normal industrial mills or even in high speed stone mills which naturally break down their raw complex Carbohydrate molecules, right at the start. In practice, only some 15% to 20% of the conventional whole grain eatable bread is a complex carb. In this object (6), several new concepts are presented, such as additives that facilitate the retention of $CO_2$ bubbles and/or their elastic membrane structure thereof. With the specific purpose of manufacturing light (with bubbles) "logicarb' bread alternatives for diabetic and weight control diets with high complex Carbohydrates coarse flours, several additives are claimed, characterized by the incorporation of 2% to 15% by weight of soluble protein (i.e. eggs), protein powder (i.e., egg whites, gluten or quinoa protein) or even mucilage (pectin, gelatin, dextrin, etc.) into the dough of "logicarb' flour rich in complex Carbohydrates, only in order to enhance membrane formation leading to bubble stability. Some of these additives are common in bakery processes of conventional cakes, for example; however, in this case, they will be exclusively claimed for the specific purpose of enabling the manufacture of bread, based on those high molecular weight and structured complex Carbohydrates coarse flours (presented in Objects 1. to 2.) for Metabolic Syndrome control diets, capable of reproducing the physical results (structure and elasticity) of an equivalent (but different) bubble membrane normally achieved by the kneading and leavening of conventional dough, rich in hydrolyzed paste, produced with highly processed flour. Although these additives are sometimes used in conventional baking processes for different purposes, their careful use in this case is aimed at specific production of breads Made out of modern "logicarb' flours with low glycemic impact, which are unable to retain $CO_2$ bubbles by themselves.

Object 7 (the use of convection to shorten complex carbs degradation time) In order to implement Object 3 (Thermal) to reduce the degradation time of complex Carbohydrates in the fast baking processes which maximize heat transfer are claimed, characterized by the use of hot air moving inside the oven (forced convection) to shorten the heating time and thereby reducing the degradation of complex starches, both at atmospheric pressure and higher pressures, though convection baking is normally used in bakery for purposes totally different from the preservation of complex molecular structures for therapeutic uses.

Object 8, (the use of microwaving) In order to implement Object 3 (Thermal), Breads, cakes, waffles and other bakery products can be pre-baked or fully baked by the action of microwave ovens, even rotating the bread loaf during baking, to minimize cooking time, in order to protect the polymerized molecular structures of their complex starches.

Object 9 (Bread chilling); it was found after the extensive experimentation, that 'logicarb' high complex Carbohydrates bread(s) have to be immediately cooled, both as a bread loaf or better as single slices. The objective is double; on one side, complex Carbohydrates have to be protected during the cooling time, capable of degrading their thermally fragile molecules; on the other, fast cooling has proved to reconstitute broken molecules into more complex fauns. This chilling of the loaf and even its slices to room temperature should occur in 6 minutes or less while normal bread cools in 30 to 120 minutes.

Object 10 (frozen storage) as "logicarb' high complex Carbohydrates flour is milled without generating high adiabatic temperatures and further baked in a few minutes, the natural germination enzymes are present and active. In just three to four days of storage at room temperature its Glycemic Index grows. "Logicarb' bread has to be frozen immediately after baking and has to be kept below −5° C. until one or two days before eating. It can be kept in the refrigerator (5° C. to 6° C.) for only a couple of days, though it can be quickly reheated and even slightly toasted in one or two minutes before eating without causing much harm to its complex Carbohydrates molecular structure, given the short time of the whole action (five minutes or less). Freezing has proved to partially reconstitute complex carbohydrate molecules which have been fractured during the previous processes. On the other hand, freezing protects "logicarb' bread(s) from developing molds or becoming rancid by their unprotected genii fats in the absence of undesirable protective chemical agents.

I claim:

1. A method for producing low glycemic index baked products, the method comprising:
    providing a grain including a glycemic index of less than 40;
    milling the grain at 0.9 meters per second or less, wherein the temperature of the grain does not exceed 45° C.;
    creating a dough from the milled grain;
    combining the dough with an additive, wherein the additive includes soluble protein, protein powder, mucilage, or combinations thereof;
    baking the dough in a convection oven to form a loaf, wherein an internal temperature of the loaf is maintained less than 99° C., wherein the dough is baked less than 12 minutes; and
    freezing the loaf immediately after baking to a temperature below −5° C.

2. The method of claim 1 wherein the grain includes einkorn, kamut, barley, quinoa, flax-seed, durum wheat, or combinations thereof.

3. The method of claim 1 wherein the additive includes eggs, egg whites, gluten, quinoa protein, pectin, gelatin, dextrin, or combinations thereof.

4. The method of claim 1 wherein the additive includes albumin, gluten, dextrin paste, or combinations thereof.

5. The method of claim 1 wherein the additive is added in an amount between, and including, 2% to 15% by weight with respect to the dry weight of the grain.

6. The method of claim 1 further including adding a partially milled grain to the dough, wherein the partially milled grain is a size between, and including, 0.1 mm to 2 mm.

7. The method of claim 1 further comprising pre-baking the dough in a microwave oven for less than 12 minutes, wherein the internal temperature of the dough is maintained less than 99° C.

8. The method of claim 1 wherein the temperature of the grain does not exceed 30° C. during the milling the grain.

9. The method of claim 1 wherein the milling includes pressing the grains into flakes at a speed of less than 0.2 meters per second.

10. The method of claim 1 further comprising cooling the loaf to room temperature after baking, wherein the loaf is cooled to room temperature in less than 6 minutes.

11. The method of claim 1 wherein the milling is performed using a grain-mill including flat-round, cylindrical, or conical shape grindstones,
    wherein the grindstones include metal, stone, or combinations thereof,
    wherein the grindstones include grooved milling surfaces.

12. The method of claim 1 wherein the milling is performed using a grain-mill including flat-round, cylindrical, or conical shape grindstones, wherein the grindstones include metal, stone, or combinations thereof, wherein the grindstones include smooth milling surfaces.

13. The method of claim 1 wherein the internal temperature of the dough is 60° C. or less during baking.

14. A method for producing low glycemic index baked products, the method comprising:
    providing a grain including a glycemic index of less than 40;
    milling the grain at 0.9 meters per second or less, wherein the temperature of the grain does not exceed 45° C.;
    creating a dough from the milled grain;
    adding an additive to the dough, wherein the additive includes soluble protein, protein powder, mucilage, or combinations thereof, wherein the additive is in an amount between, and including, 2% to 15% by weight with respect to the dry weight of the grain;
    adding a partially milled grain to the dough, wherein the partially milled grain has a size of 0.1 mm to 2 mm;
    baking the dough in a microwave oven to form a loaf, wherein an internal temperature of the loaf does not exceed 99° C., wherein the dough is baked less than 12 minutes;
    cooling the loaf to room temperature after baking, wherein the loaf is cooled to room temperature in less than 6 minutes; and
    freezing the loaf to a temperature below −5° C.

15. The method of claim 14 wherein the milling includes pressing the grains into flakes at a speed of less than 0.2 meters per second.

16. The method of claim 14 wherein the milling is performed using a grain-mill including flat-round, cylindrical, or conical shape grindstones,
    wherein the grindstones include metal, stone, or combinations thereof,
    wherein the grindstones include grooved milling surfaces.

17. The method of claim 14 wherein the milling is performed using a grain-mill including flat-round, cylindrical, or conical shape grindstones, wherein the grindstones include metal, stone, or combinations thereof, wherein the grindstones include smooth milling surfaces.

18. The method of claim 14 wherein the internal temperature of the dough is 60° C. or less during baking.

\* \* \* \* \*